US012618380B2

(12) United States Patent
McCaffrey

(10) Patent No.: US 12,618,380 B2
(45) Date of Patent: May 5, 2026

(54) VARIABLE AREA NOZZLE FOR AN AIRCRAFT ENGINE

(71) Applicant: RTX Corporation, Farmington, CT (US)

(72) Inventor: Michael G. McCaffrey, Windsor, CT (US)

(73) Assignee: RTX Corporation, Farmington, CT (US)

(*) Notice: Subject to any disclaimer, the term of this patent is extended or adjusted under 35 U.S.C. 154(b) by 166 days.

(21) Appl. No.: 18/411,712

(22) Filed: Jan. 12, 2024

(65) Prior Publication Data

US 2025/0334086 A1    Oct. 30, 2025

(51) Int. Cl.
F02K 1/08 (2006.01)

(52) U.S. Cl.
CPC .......... F02K 1/08 (2013.01); *F05D 2220/323* (2013.01); *F05D 2240/128* (2013.01); *F05D 2240/50* (2013.01); *F05D 2250/231* (2013.01); *F05D 2250/232* (2013.01)

(58) Field of Classification Search
CPC ........................................................ F02K 1/08
See application file for complete search history.

(56) References Cited

U.S. PATENT DOCUMENTS 2,826,895 A     3/1958 English
2,938,335 A  *  5/1960 Cook, Jr. .................. F02K 1/58
                                                    239/533.1

4,527,388 A  *  7/1985 Wallace, Jr. .............. F02K 1/09
                                                    239/265.33
5,105,615 A  *  4/1992 Herzog ................... F02C 7/042
                                                    60/803
5,884,843 A  *  3/1999 Lidstone .................. F02K 1/36
                                                    239/265.17
2012/0192543 A1     8/2012 Aeberli

FOREIGN PATENT DOCUMENTS

GB          838038 A     6/1960
GB          875496 A  *  8/1961  ............... F02K 1/16

OTHER PUBLICATIONS

EP Search Report for EP Patent Application No. 25151498.0 dated Jun. 4, 2025.

* cited by examiner

*Primary Examiner* — Andrew H Nguyen
(74) *Attorney, Agent, or Firm* — Getz Balich LLC

(57) ABSTRACT

A variable area nozzle for an aircraft engine includes a nozzle inner structure, a nozzle outer structure, an actuation system and a flowpath. The nozzle inner structure includes a nozzle wall and a nozzle sleeve. The nozzle wall includes a plurality of slots arranged circumferentially about the axis. Each of the slots projects radially through the nozzle wall. The nozzle sleeve axially overlaps and circumscribes the nozzle wall. The actuation system includes a carriage and an actuator. The carriage includes a hub and a plurality of struts arranged circumferentially about and connected to the hub. Each of the struts projects radially through a respective slot where the nozzle sleeve is attached to the carriage at an outer end of the carriage. The actuator is disposed radially within the inner nozzle wall and is coupled to the hub. The actuation system moves the nozzle sleeve axially along the nozzle wall.

20 Claims, 8 Drawing Sheets

VARIABLE AREA NOZZLE FOR AN AIRCRAFT ENGINE

BACKGROUND OF THE DISCLOSURE

1. Technical Field

This disclosure relates generally to an aircraft engine and, more particularly, to a variable area nozzle for the aircraft engine.

2. Background Information

An aircraft engine may include a variable area nozzle. Various types and configurations of variable area nozzles are known in the art. While these known variable area nozzles have various benefits, there is still room in the art for improvement.

SUMMARY OF THE DISCLOSURE

According to an aspect of the present disclosure, an apparatus is provided for an aircraft engine. This apparatus includes a variable area nozzle. The variable area nozzle includes a nozzle inner structure, a nozzle outer structure, an actuation system and a flowpath extending axially along an axis through the variable area nozzle and radially between the nozzle inner structure and the nozzle outer structure. The nozzle inner structure includes a nozzle wall and a nozzle sleeve. The nozzle wall extends axially along and circumferentially around the axis. The nozzle wall includes a plurality of slots arranged circumferentially about the axis. Each of the slots projects radially through the nozzle wall. The nozzle sleeve axially overlaps and circumscribes the nozzle wall. The actuation system includes a carriage and an actuator. The carriage includes a hub and a plurality of struts arranged circumferentially about and connected to the hub. Each of the struts projects radially through a respective one of the slots where the nozzle sleeve is attached to the carriage at an outer end of the carriage. The actuator is disposed radially within the inner nozzle wall and is coupled to the hub. The actuation system is configured to move the nozzle sleeve axially along the nozzle wall.

According to another aspect of the present disclosure, another apparatus is provided for an aircraft engine. This apparatus includes a variable area nozzle. The variable area nozzle includes a nozzle inner structure, a nozzle outer structure, an actuation system and a flowpath extending axially through the variable area nozzle. The nozzle inner structure includes a nozzle wall and a nozzle sleeve. The nozzle wall extends axially along and circumferentially around an axis. The nozzle wall is configured to radially locate and support the nozzle sleeve. The nozzle sleeve extends axially along and circumferentially around the nozzle wall. The nozzle wall and the nozzle sleeve collectively form an inner peripheral boundary of the flowpath through the variable area nozzle. The nozzle outer structure forms an outer peripheral boundary of the flowpath through the variable area nozzle. The actuation system includes an actuator located radially within the nozzle wall. The actuator is operatively coupled to the nozzle sleeve radially across the nozzle wall. The actuation system is configured to translate the nozzle sleeve axially along the nozzle wall using the actuator.

According to still another aspect of the present disclosure, another apparatus is provided for an aircraft engine. This apparatus includes an inner structure, an outer structure and an actuation system. The inner structure includes a wall and a sleeve. The wall extends axially along and circumferentially around an axis. The wall is configured to radially locate and support the sleeve. The sleeve extends axially along and circumferentially around the wall. The wall and the sleeve collectively form an inner peripheral boundary of a flowpath. The outer structure extends axially along and circumferentially about the inner structure. The outer structure forms an outer peripheral boundary of the flowpath. The actuation system includes an actuator and a carriage operatively coupling the actuator to the sleeve radially across the wall. The actuator is arranged within an internal volume of the inner structure radially inboard of the wall. The actuation system is configured to translate the sleeve axially along the wall between a first position and a second position.

The actuation system may also include a carriage operatively coupling the actuator to the nozzle sleeve. The carriage may be radially engaged with and may be configured to translate axially along the nozzle wall.

The actuation system may also include a carriage operatively coupling the actuator to the nozzle sleeve. The carriage may be configured to transfer radial loads between the nozzle sleeve and the nozzle wall.

The actuation system may also include a carriage operatively coupling the actuator to the nozzle sleeve. A portion of the carriage may project radially through an aperture in the nozzle wall.

The carriage may also include a rim forming the outer end of the carriage. The nozzle sleeve may be attached to the rim. Each of the struts may extend radially across the nozzle wall between the hub and the rim.

The carriage may also include an inner platform and an inner bearing. The inner platform may be radially inboard of the nozzle wall with each of the struts projecting radially out from the inner platform. The inner bearing may be radially between and engaged with the inner platform and the nozzle wall.

The inner bearing may be configured as or otherwise include a bushing.

The carriage may also include an outer platform and an outer bearing. The outer platform may be radially outboard of the nozzle wall with each of the struts projecting radially in from the outer platform. The outer bearing may be radially between and engaged with the outer platform and the nozzle wall.

The outer bearing may be configured as or otherwise include a bushing.

The carriage may be attached to a portion of the nozzle sleeve with a frustoconical geometry.

The carriage may be attached to a portion of the nozzle sleeve with a cylindrical geometry.

The nozzle sleeve may extend axially between an upstream end and a downstream end. The carriage may be attached to the nozzle sleeve at a location axially closer to the downstream end than the upstream end.

The downstream end may be radially spaced from the nozzle wall by an annular gap.

A portion of the nozzle sleeve at the upstream end may abut radially against and may be configured to slide along the nozzle wall.

The nozzle sleeve may extend axially between an upstream end and a downstream end. An outer surface of the nozzle sleeve may radially taper inward towards the axis as the nozzle sleeve extends axially towards the downstream end.

The nozzle inner structure may also include a mount. The nozzle wall may circumscribe and may be connected to the mount. The actuator may be coupled to the mount. The actuator may extend axially between the mount and the carriage.

The actuator may be configured as or otherwise include a linear actuator.

The variable area nozzle may be configured as a convergent-divergent nozzle.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
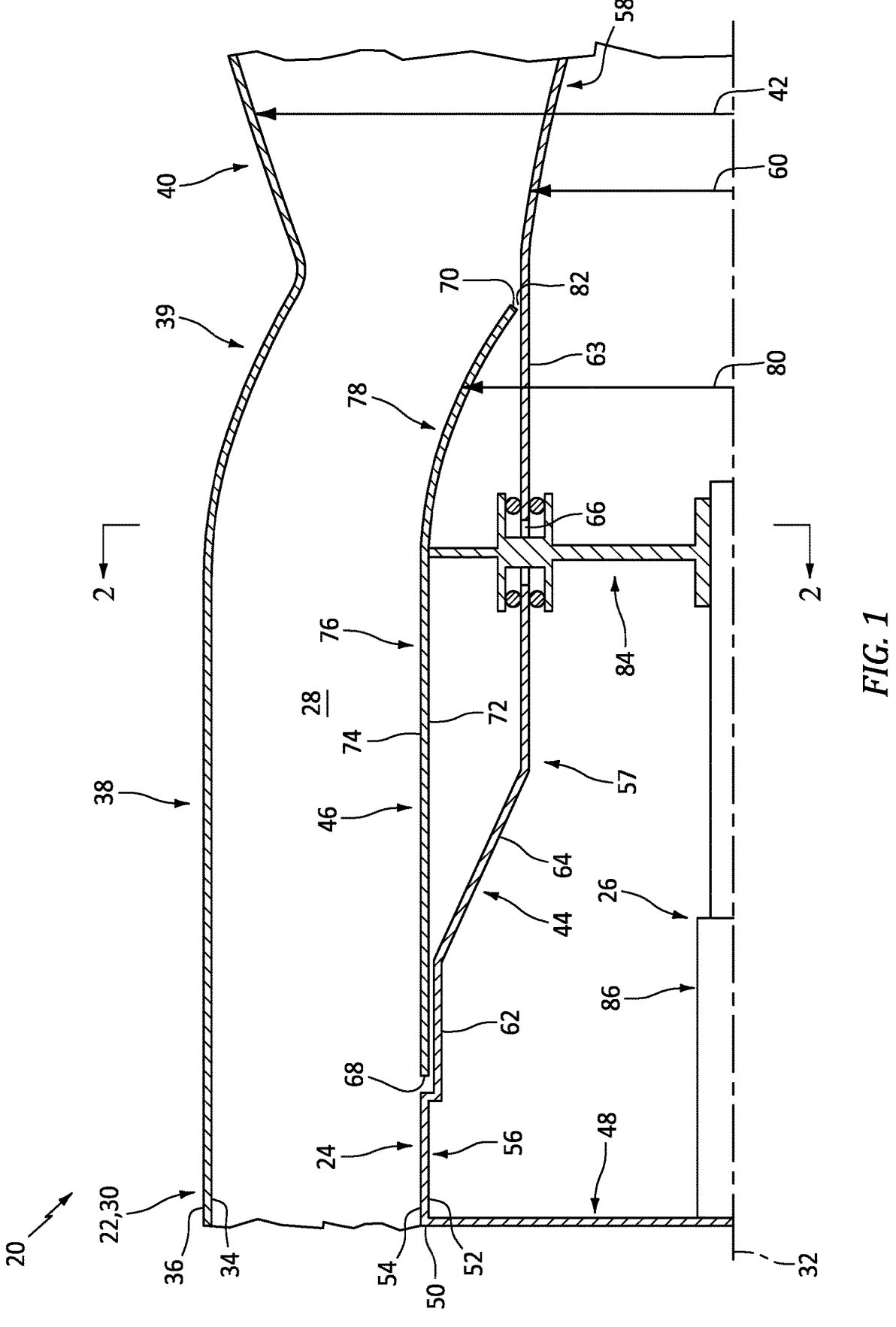
FIG. 1 is a partial side cutaway illustration of a variable area nozzle.

FIG. 1 illustrates a (e.g., convergent-divergent) variable area nozzle 20 for an engine of an aircraft. The aircraft engine may be a gas turbine engine, a pulsejet engine, a rotating detonation engine, a ramjet engine or any other type of suitable combustion engine. This aircraft engine may be configured as, or included as part of, a propulsion system for the aircraft. The aircraft engine may alternatively (or also) be configured as, or included as part of, an electrical power system for the aircraft. The aircraft may be an airplane, a helicopter, a drone (e.g., an unmanned aerial vehicle (UAV)) or any other manned or unmanned aerial vehicle or system. The variable area nozzle 20 of FIG. 1 includes a nozzle outer structure 22, a nozzle inner structure 24, an actuation system 26 and a flowpath 28; e.g., a core flowpath of the aircraft engine.

The outer structure 22 may be configured as or otherwise include an outer nozzle wall 30; e.g., a tubular flowpath wall. This outer nozzle wall 30 extends axially along an axis 32 from a forward, upstream end of the outer nozzle wall 30 to an aft, downstream end of the outer nozzle wall 30, which outer nozzle wall ends are not visible in FIG. 1. Briefly, the axis 32 may be a centerline axis of the variable area nozzle 20 and/or one or more of its members 22, 24 and/or 26. The axis 32 may also or alternatively be a rotational axis of one or more rotating structures within the aircraft engine. The outer nozzle wall 30 extends circumferentially about (e.g., completely around) the axis 32, which may provide the outer nozzle wall 30 with a full-hoop (e.g., tubular) geometry. The outer nozzle wall 30 extends radially between and to a radial inner side 34 of the outer structure 22 and its outer nozzle wall 30 and a radial outer side 36 of the outer nozzle wall 30.

The outer nozzle wall 30 of FIG. 1 is configured with one or more wall sections 38-40. The upstream wall section 38 may extend axially from the upstream end of the outer nozzle wall 30 to the intermediate wall section 39. This upstream wall section 38 of FIG. 1 has a (e.g., regular) cylindrical geometry. The intermediate wall section 39 extends axially between and is connected to the upstream wall section 38 and the downstream wall section 40. This intermediate wall section 39 of FIG. 1 has a (e.g., curved) frustoconical geometry and may form a convergent section of the outer structure 22 and its outer nozzle wall 30. A radius 42 from the axis 32 to the outer wall inner side 34, for example, decreases as the intermediate wall section 39 extends axially along the axis 32 from (or about) the upstream wall section 38 to (or about) the downstream wall section 40. The downstream wall section 40 may extend axially from the intermediate wall section 39 to the downstream end of the outer nozzle wall 30. This downstream wall section 40 of FIG. 1 has a (e.g., curved) frustoconical geometry and may form a divergent section of the outer structure 22 and its outer nozzle wall 30. The radius 42 from the axis 32 to the outer wall inner side 34, for example, increases as the downstream wall section 40 extends axially along the axis 32 from (or about) the intermediate wall section 39 to (or towards) the downstream end of the outer nozzle wall 30. The present disclosure, however, is not limited to such an exemplary outer nozzle wall arrangement. For example, the outer nozzle wall 30 may omit the downstream wall section 40 and, thus, may omit the divergent section of the outer structure 22 and its outer nozzle wall 30. In addition or alternatively, the upstream wall section 38 may be configured as an upstream extension of the intermediate wall section 39 and, thus, the convergent section of the outer structure 22 and its outer nozzle wall 30.

The outer structure 22 and its outer nozzle wall 30 are spaced radially outboard from the inner structure 24 and its members (e.g., 44 and 46) by the flowpath 28. The outer structure 22 and its outer nozzle wall 30 also extend axially along (e.g., axially overlap) and extend circumferentially about (e.g., circumscribe) the inner structure 24 and its members (e.g., 44 and 46). With this arrangement, the outer structure 22 and its outer nozzle wall 30 may form a radial outer peripheral boundary of the flowpath 28 axially through the variable area nozzle 20.

The inner structure 24 of FIG. 1 includes the inner nozzle wall 44 (e.g., a sleeve support wall) and the translating nozzle sleeve 46. The inner structure 24 of FIG. 1 also includes an actuator mount 48.

The inner nozzle wall 44 extends axially along the axis 32 from a forward, upstream end 50 of the inner nozzle wall 44 to an aft, downstream end of the inner nozzle wall 44, which inner nozzle wall downstream end is not visible in FIG. 1. The inner nozzle wall 44 extends circumferentially about (e.g., completely around) the axis 32, which may provide the inner nozzle wall 44 with a full-hoop (e.g., tubular) geometry. The inner nozzle wall 44 extends radially between and to a radial inner side 52 of the inner nozzle wall 44 and a radial outer side 54 of the inner nozzle wall 44.

The inner nozzle wall 44 of FIG. 1 is configured with one or more wall sections 56-58. The upstream wall section 56 extends from the upstream end 50 of the inner nozzle wall 44 to the intermediate wall section 57. This upstream wall section 56 of FIG. 1 has a (e.g., regular) cylindrical geometry. The intermediate wall section 57 extends axially between and is connected to the upstream wall section 56 and the downstream wall section 58. The downstream wall section 58 may extend axially from the intermediate wall section 57 to the downstream end of the inner nozzle wall 44. This downstream wall section 58 of FIG. 1 has a (e.g., curved) frustoconical geometry and may form a divergent section of the inner structure 24 and its inner nozzle wall 44. A radius 60 from the axis 32 to the inner wall outer side 54, for example, decreases as the downstream wall section 58 extends axially along the axis 32 from (or about) the intermediate wall section 57 to (or towards) the downstream end of the inner nozzle wall 44.

Figure 2:
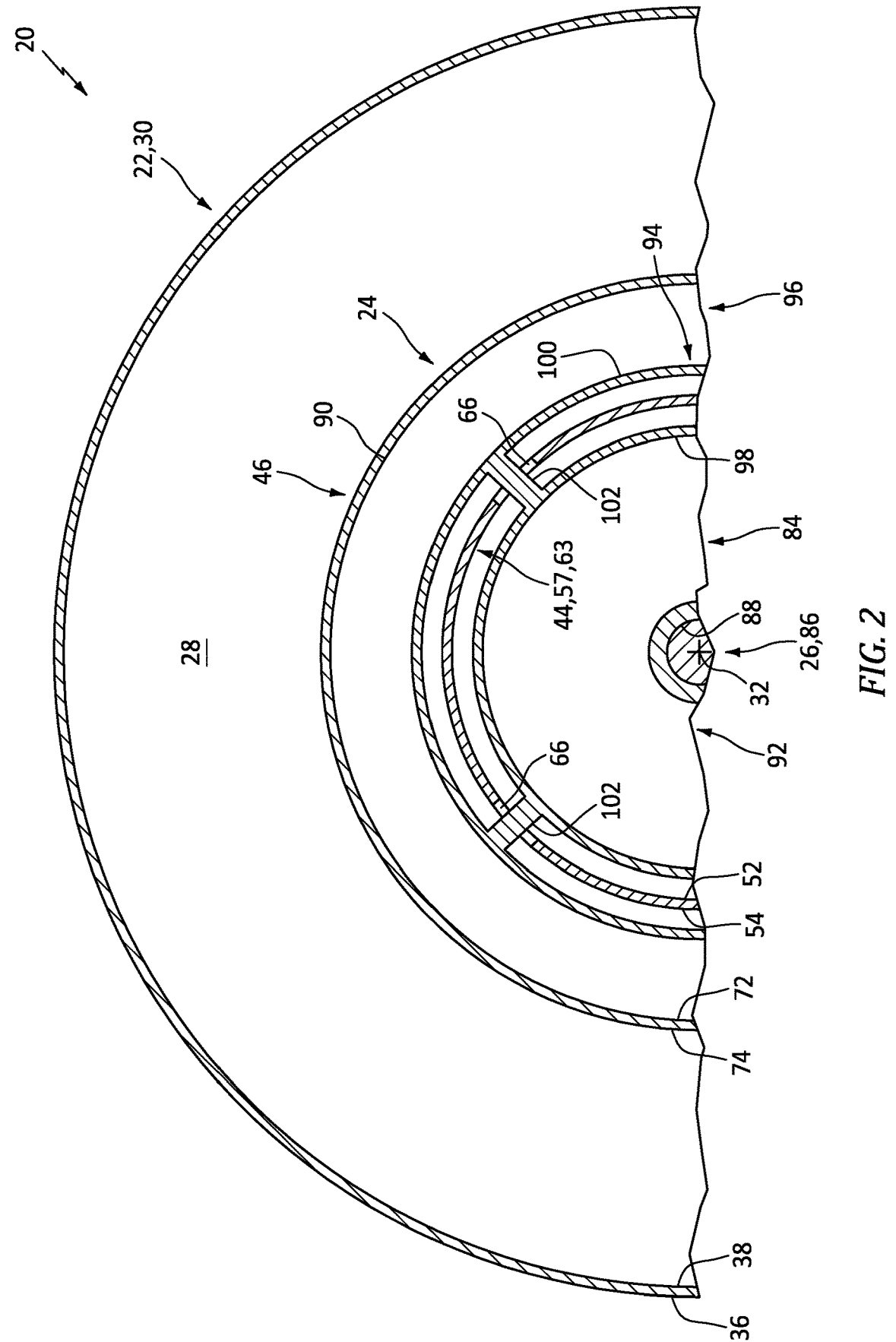
FIG. 2 is a partial cross-sectional illustration of the variable area nozzle taken along line 2-2 in FIG. 1.

The intermediate wall section 57 of FIG. 1 includes an upstream land 62, a downstream land 63 and a transition 64. The upstream land 62 is connected to the upstream wall section 56, and the upstream land 62 is disposed axially adjacent and aft, downstream of the upstream wall section 56. This upstream land 62 of FIG. 1 is (e.g., slightly) radially recessed inward (radially towards the axis 32) from the upstream wall section 56. The upstream land 62 may have a (e.g., regular) cylindrical geometry. The downstream land 63 is connected to the downstream wall section 58, and the downstream land 63 is disposed axially adjacent and forward, upstream of the downstream wall section 58. This downstream land 63 of FIG. 1 is radially recessed inward (radially towards the axis 32) from the upstream land 62. The downstream land 63 may have a (e.g., regular) cylindrical geometry. The downstream land 63 also includes one or more apertures 66; e.g., axially elongated slots. Referring to FIG. 2, the apertures 66 are arranged circumferentially (e.g., an equispaced) around the axis 32 in an array; e.g., a circular array. Each of these apertures 66 extends radially through the inner nozzle wall 44 and its downstream land 63 from the inner wall inner side 52 to the inner wall outer side 54. Each of the apertures 66 extends laterally (e.g., circumferentially) within the inner nozzle wall 44 and its downstream land 63 between opposing lateral sides of the respective aperture 66. Referring to FIG. 1, each of the apertures 66 extends axially within the inner nozzle wall 44 and its downstream land 63 between opposing axial ends of the respective aperture 66. The transition 64 extends axially between and is connected to the upstream land 62 and the downstream land 63. This transition 64 has a frustoconical geometry and radially tapers from the upstream land 62 to the downstream land 63. The radius 60 from the axis 32 to the inner wall outer side 54, for example, decreases as the intermediate wall section 57 and its transition 64 extend axially along the axis 32 from (or about) the upstream land 62 to (or towards) the downstream land 63. The present disclosure, however, is not limited to such an exemplary inner nozzle wall arrangement. For example, the upstream wall section 56 may be omitted and the upstream land 62 may be disposed at the upstream end 50 of the inner nozzle wall 44.

The nozzle sleeve 46 extends axially along the axis 32 from a forward, upstream end 68 of the nozzle sleeve 46 to an aft, downstream end 70 of the nozzle sleeve 46. The nozzle sleeve 46 extends circumferentially about (e.g., completely around) the axis 32, which may provide the nozzle sleeve 46 with a full-hoop (e.g., tubular) geometry. The nozzle sleeve 46 extends radially between and to a radial inner side 72 of the nozzle sleeve 46 and a radial outer side 74 of the nozzle sleeve 46.

The nozzle sleeve 46 of FIG. 1 is configured with one or more sleeve sections 76 and 78. The upstream sleeve section 76 extends from the upstream end 68 of the nozzle sleeve 46 to the downstream sleeve section 78. This upstream sleeve section 76 of FIG. 1 has a (e.g., regular) cylindrical geometry. The downstream sleeve section 78 extends from the upstream sleeve section 76 to the downstream end 70 of the nozzle sleeve 46. This downstream sleeve section 78 of FIG. 1 has a (e.g., curved) frustoconical geometry and radially tapers from (or about) the upstream sleeve section 76 to (or towards) the inner nozzle wall 44 and its downstream land 63. A radius 80 from the axis 32 to the sleeve outer side 74, for example, decreases as the downstream sleeve section 78 extends axially along the axis 32 from (or about) the upstream sleeve section 76 to (or towards) the downstream end 70 of the nozzle sleeve 46.

The nozzle sleeve 46 is disposed radially outboard of the inner nozzle wall 44 and its intermediate wall section 57. The nozzle sleeve 46 also extends axially along (e.g., axially overlaps) and extends circumferentially about (e.g., circumscribes) the inner nozzle wall 44 and its intermediate wall section 57. A portion of the upstream sleeve section 76 of FIG. 1 at the upstream end 68 of the nozzle sleeve 46 is arranged radially next to (e.g., adjacent) the upstream land 62. Here, the upstream sleeve section 76 radially engages (e.g., contacts, abuts against, etc.) and is moveable (e.g., slidable) along the upstream land 62. A portion of the downstream sleeve section 78 of FIG. 1 at the downstream end 70 of the nozzle sleeve 46 is arranged radially next to the downstream land 63. Here, the downstream sleeve section 78 and, more particularly, its downstream end 70 is (e.g., slightly) spaced radially outward from downstream land 63 by a gap 82; e.g., an annular gap. In other embodiments, however, the downstream sleeve section 78 and its downstream end 70 may alternatively radially engage the downstream land 63. With the foregoing arrangements, the inner structure 24 forms a radial inner peripheral boundary of the flowpath 28 axially through the variable area nozzle 20. More particularly, the inner nozzle wall 44 and the nozzle sleeve 46 collectively form the radial inner peripheral boundary of the flowpath 28 axially through the variable area nozzle 20.

The actuator mount 48 is configured to provide a mount for attaching the actuation system 26 to the inner structure 24. The actuator mount 48 of FIG. 1, for example, is configured as a bulkhead and/or a frame connected to (e.g., formed integral with or otherwise attached to) the inner nozzle wall 44 at (e.g., on, adjacent or proximate) the upstream end 50 of the inner nozzle wall 44. This actuator mount 48 of FIG. 1 projects radially inward from the inner nozzle wall 44 to (or towards) the axis 32.

Figure 3:
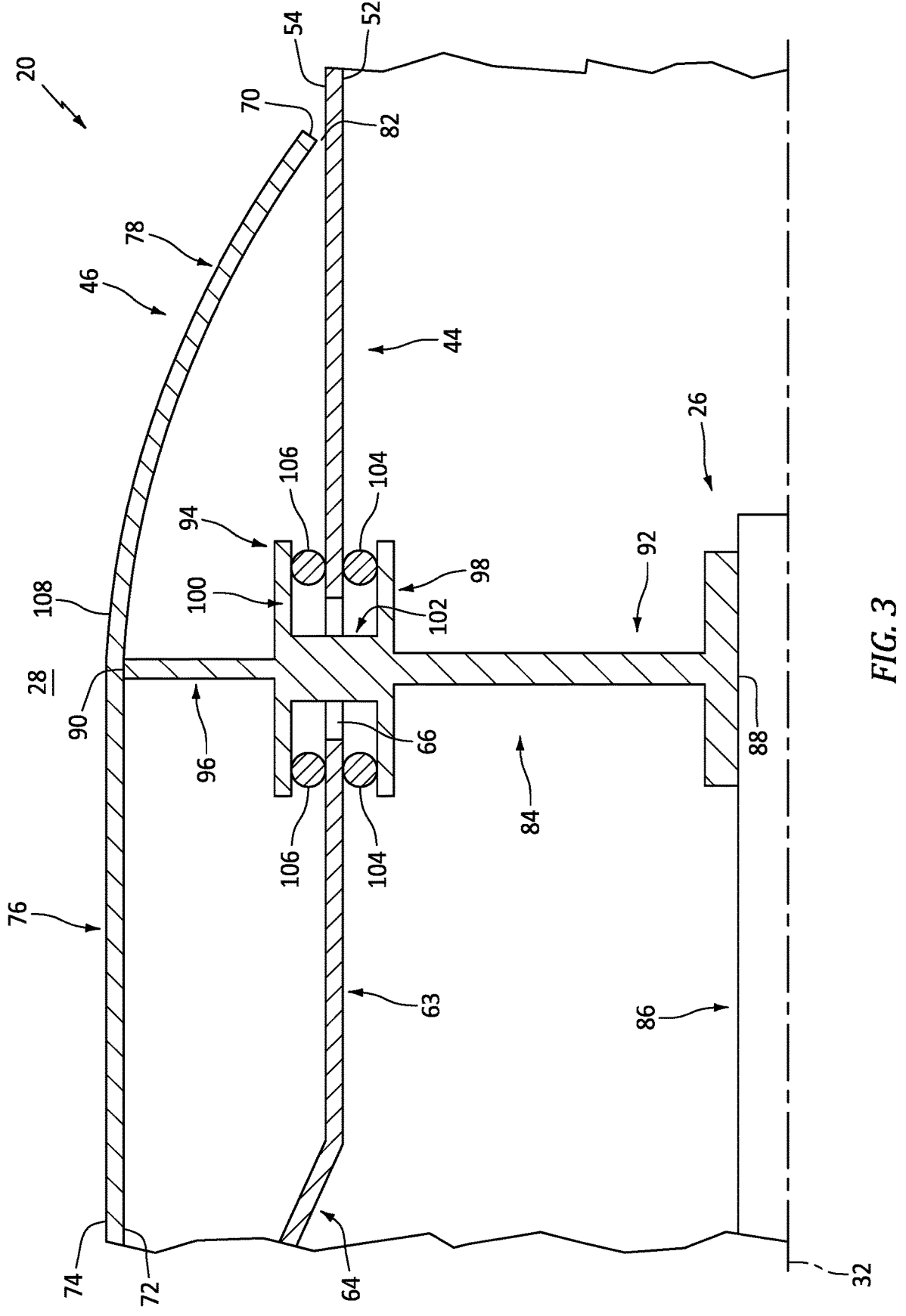
FIG. 3 is a partial side cutaway illustration of the variable area nozzle at a carriage for an actuation system.

The actuation system 26 of FIG. 1 includes a carriage 84 (e.g., a unison wheel) and an actuator 86. Referring to FIG. 3, the carriage 84 extends radially between and to a radial inner end 88 of the carriage 84 and a radial outer end 90 of the carriage 84. This carriage 84 includes a hub 92, a coupler 94 and a rim 96.

The hub 92 is disposed at the carriage inner end 88, and is located radially inboard of the inner structure 24 and its inner nozzle wall 44. The hub 92 projects radially outward from the carriage inner end 88 to the coupler 94. The hub 92 extend axially between and to opposing axial sides of the hub 92. The hub 92 extends circumferentially about (e.g., completely around) the axis 32, which may provide the hub 92 with a full-hoop (e.g., annular) geometry.

The coupler 94 is configured to couple the hub 92 to the rim 96 radially across the inner nozzle wall 44. The coupler 94 of FIG. 3, for example, includes an inner platform 98, an outer platform 100 and one or more struts 102; see also FIG. 2. Each of the platforms 98, 100 extends axially between and to opposing axial ends of the coupler 94. Referring to FIG. 2, each of the platforms 98, 100 extends circumferentially about (e.g., completely around) the axis 32, which may provide the respective platform 98, 100 with a full-hoop (e.g., tubular) geometry. Referring again to FIG. 3, the inner platform 98 is connected to and is disposed radially outboard of the hub 92. The inner platform 98 is disposed radially inboard of the inner nozzle wall 44 and its downstream land 63, and the inner platform 98 may radially engage the inner nozzle wall 44 and its downstream land 63 through one or more inner bearings 104 (e.g., bushings, etc.) and/or seal elements. Similarly, the outer platform 100 is connected to and is disposed radially inboard of the rim 96. The outer platform 100 is disposed radially outboard of the inner nozzle wall 44 and its downstream land 63, and the outer platform 100 may radially engage the inner nozzle wall 44 and its downstream land 63 through one or more outer bearings 106 (e.g., bushings, etc.) and/or seal elements. Referring to FIG. 2, the struts 102 are arranged circumferentially about the axis 32 in an array; e.g., a circular array. This array of struts 102 circumscribes the inner platform 98 and is circumscribed by the outer platform 100. Each of the struts 102 is disposed radially between and connected to the inner platform 98 and the outer platform 100. More particularly, each of the struts 102 projects radially out from the inner platform 98, radially through a respective one of the apertures 66, and to the outer platform 100.

Referring to FIG. 3, the rim 96 is disposed at the carriage outer end 90. The rim 96 is located radially outboard of the inner nozzle wall 44 and is located radially inboard of the nozzle sleeve 46. The rim 96 projects radially inward from the carriage outer end 90 to the coupler 94. The rim 96 extend axially between and to opposing axial sides of the rim 96. The rim 96 extends circumferentially about (e.g., completely around) the axis 32, which may provide the rim 96 with a full-hoop (e.g., annular) geometry.

Figure 4:
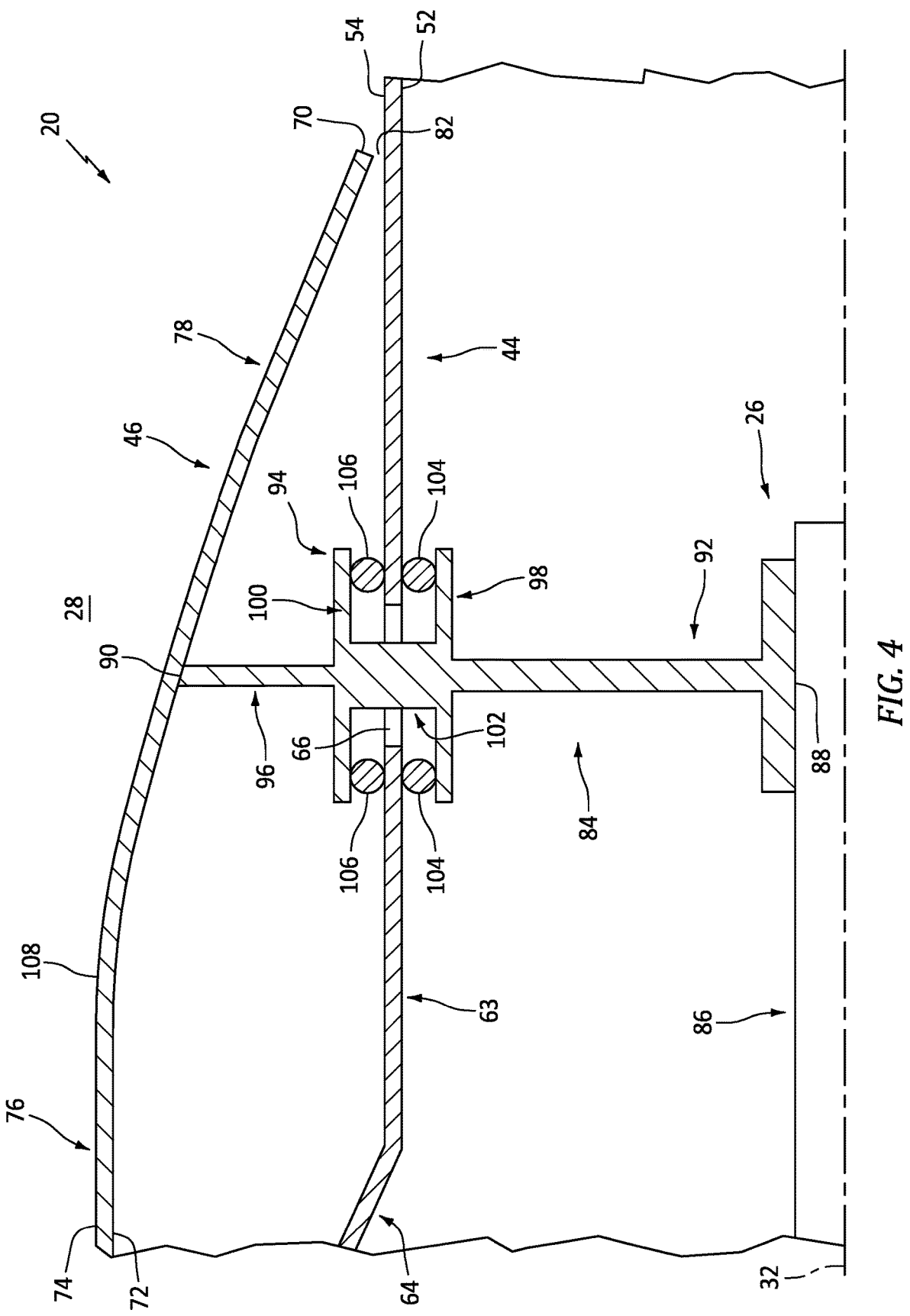
FIG. 4 is a partial side cutaway illustration of the variable area nozzle with an alternative nozzle sleeve arrangement at the carriage.

The carriage 84 and its rim 96 are connected to the nozzle sleeve 46 at an outer periphery of the carriage 84—the carriage outer end 90. The rim 96, for example, may be mechanically fastened, bonded and/or otherwise attached to the nozzle sleeve 46. Here, the rim 96 is connected to the upstream sleeve section 76, at or near and upstream of an intersection 108 between the sleeve sections 76 and 78. However, referring to FIG. 4, the rim 96 may alternatively be connected to the downstream sleeve section 78, at or near and downstream of the intersection 108.

Referring to FIG. 1, the actuator 86 may be configured as a linear actuator. Examples of the linear actuator include, but are not limited to, a jackscrew and a fluid (e.g., hydraulic) piston. The actuator 86 of FIG. 1 is disposed radially within an interior volume of the inner structure 24 and its inner nozzle wall 44. More particularly, the actuator 86 is located radially inboard of the inner structure 24 and its inner nozzle wall 44. The actuator 86, for example, may be arranged coaxial with the axis 32. The actuator 86 of FIG. 1 extends axially between and is coupled to the actuator mount 48 and the carriage 84 and its hub 92.

Figure 5A:
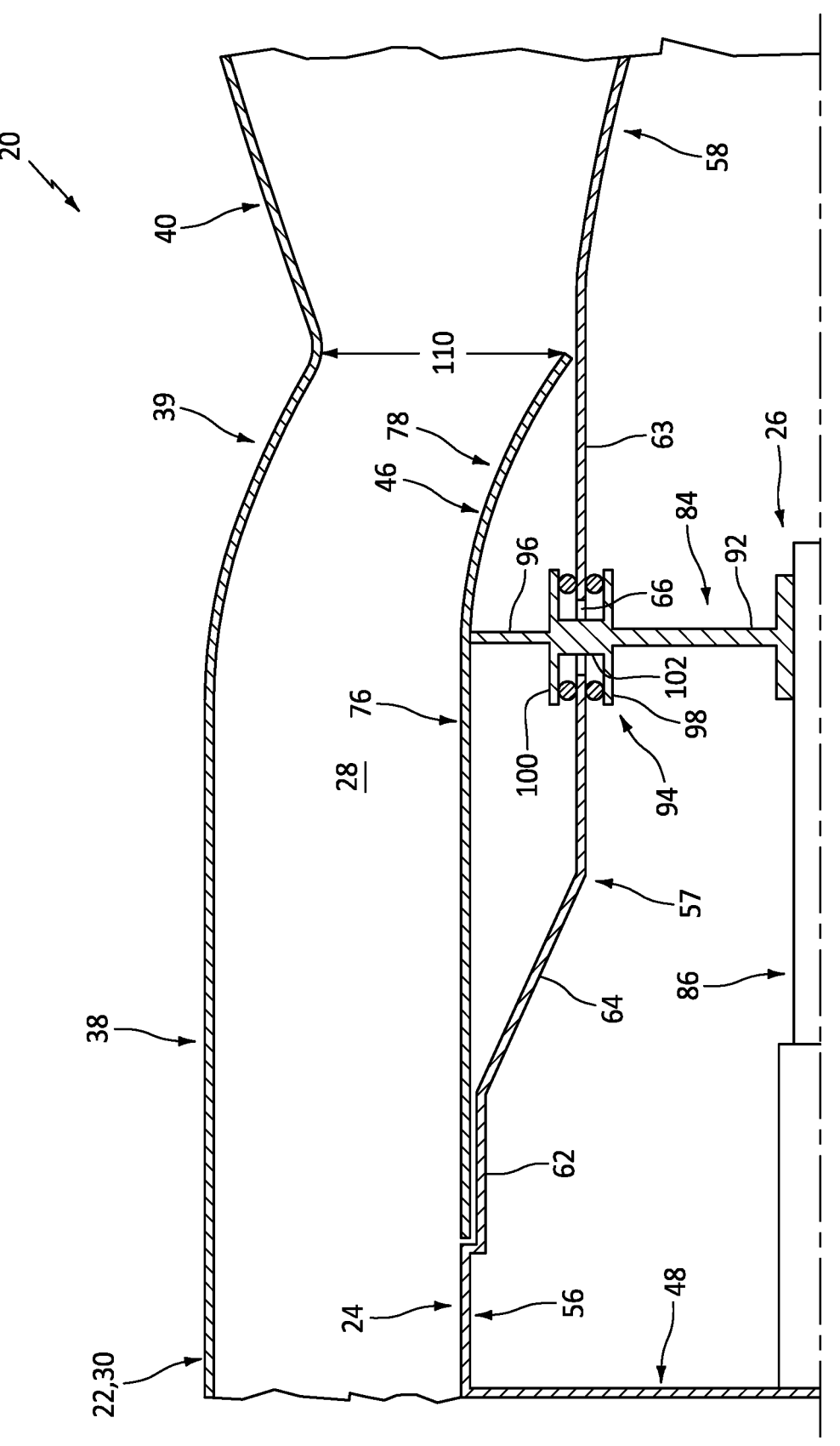
FIGS. 5A and 5B are partial side cutaway illustrations of the variable area nozzle with its nozzle sleeve in various positions.
Figure 5B:
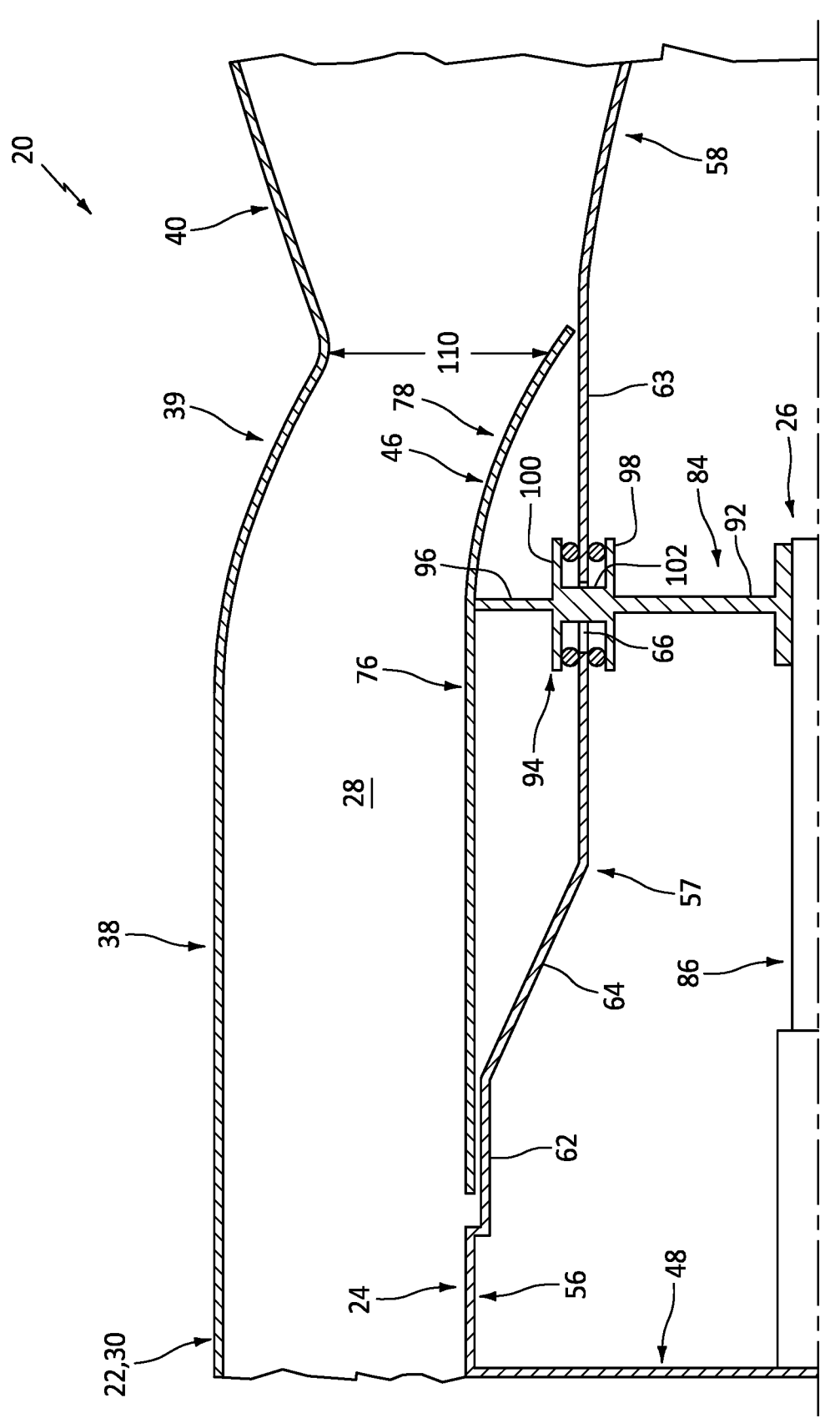

During operation, the actuation system 26 and its actuator 86 may move (e.g., translate) the nozzle sleeve 46 axially along the inner nozzle wall 44 between a first position (e.g., see FIG. 5A) and a second position (e.g., see FIG. 5B). For example, to move the nozzle sleeve 46 towards or to the first position of FIG. 5A, the actuator 86 may move (e.g., pull) the carriage 84 axially towards the actuator mount 48. During this movement, the struts 102 move (e.g., slide) axially within the apertures 66, and the carriage 84 moves the nozzle sleeve 46 in a forward, upstream direction; e.g., right-to-left. In the first position of FIG. 5A, a choke point through the variable area nozzle 20 has a first cross-sectional area; e.g., see radial flowpath height 110. In another example, to move the nozzle sleeve 46 towards or to the second position of FIG. 5B, the actuator 86 may move (e.g., push) the carriage 84 axially away from the actuator mount 48. During this movement, the struts 102 move axially within the apertures 66, and the carriage 84 moves the nozzle sleeve 46 in an aft, downstream direction; e.g., left-to-right. In the second position of FIG. 5B, the choke point through the variable area nozzle 20 has a second cross-sectional area (e.g., see radial flowpath height 110) which is different (e.g., less) than the first cross-sectional area. Thus, by moving the nozzle sleeve 46 axially somewhere between or to the first position or the second position, flow area through the variable area nozzle 20 may be selectively tailored.

Depending on how and/or where the variable area nozzle 20 is implemented within the aircraft engine, the nozzle sleeve 46 may be subject to relatively large radial loads. Relatively high pressure gas (e.g., combustion products) flowing through the flowpath 28, for example, may push the nozzle sleeve 46 radially inward. With the arrangement of FIG. 1, these radial pressure loads may be supported by the inner structure 24 and its inner nozzle wall 44. The upstream sleeve section 76, for example, may rest against the upstream land 62. A remainder of the nozzle sleeve 46 may be radially supported by the carriage 84, where the coupler 94 of FIG. 3 may rest against the downstream land 63. Thus, the inner nozzle wall 44 along with the carriage 84 may maintain the nozzle sleeve 46 in a centered location while also structurally supporting the nozzle sleeve 46.

In some embodiments, referring to FIG. 1, the inner structure 24 and the actuator mount 48 may be formed from a first material and the nozzle sleeve 46 may be formed from a second material. The first material may be different than the second material. The first material, for example, may be metal and the second material may be ceramic (e.g., ceramic matrix composite (CMC)) or a different type of metal. The present disclosure, however, is not limited to such an exemplary multi-material construction. For example, the first material may alternatively be the same as (or similar to) the second material; e.g., both materials may be a common type of metal.

Figure 6:
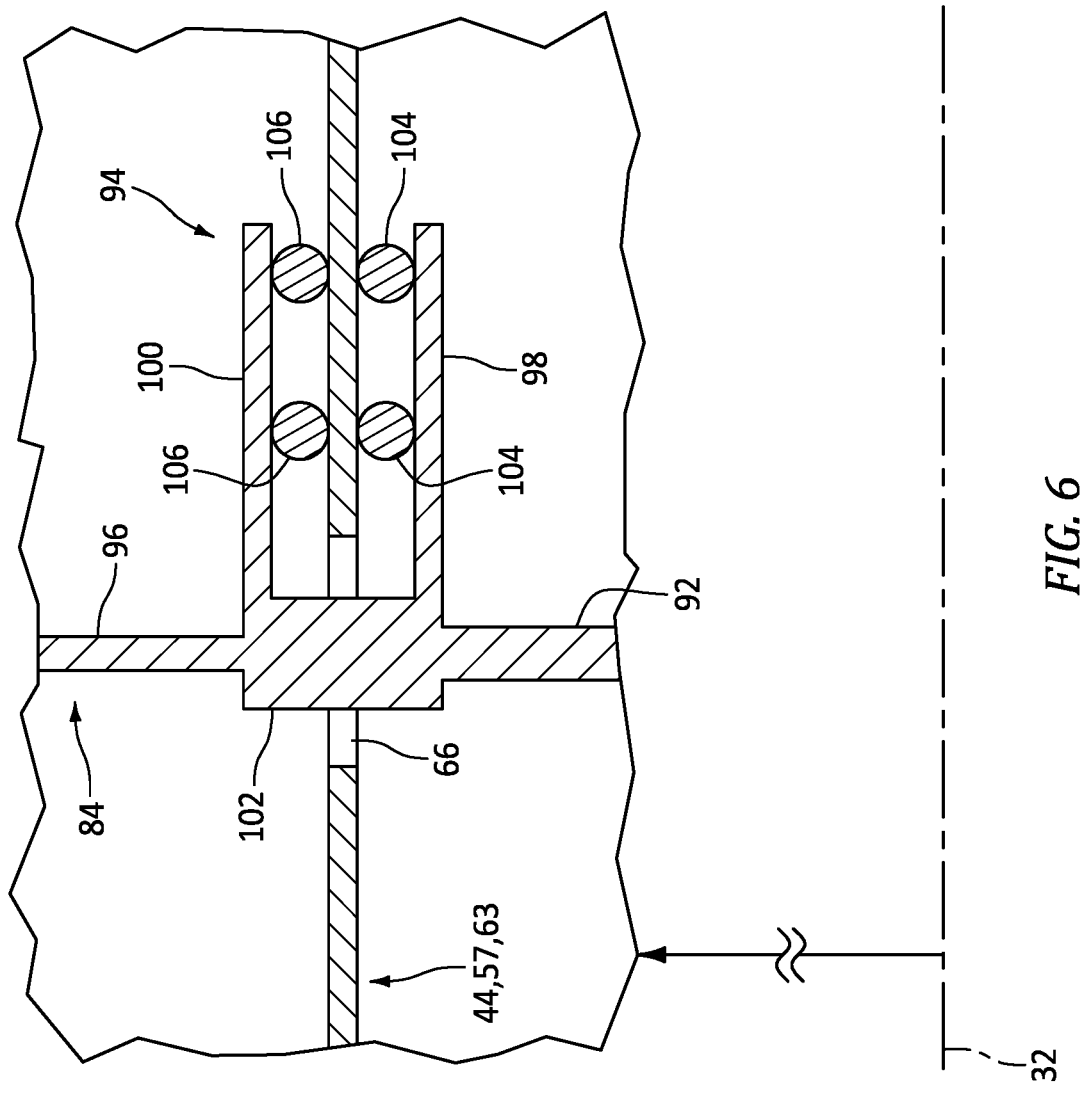
FIG. 6 is a partial side sectional illustration of the variable area nozzle at a coupler for the carriage.

In some embodiments, referring to FIG. 3, the bearings 104, 106 may be arranged to opposing axial sides of the struts 102. In other embodiments, referring to FIG. 6, the bearings 104, 106 may be arranged to a common axial side of the struts 102; e.g., to an aft, downstream side of the struts 102.

Figure 7:
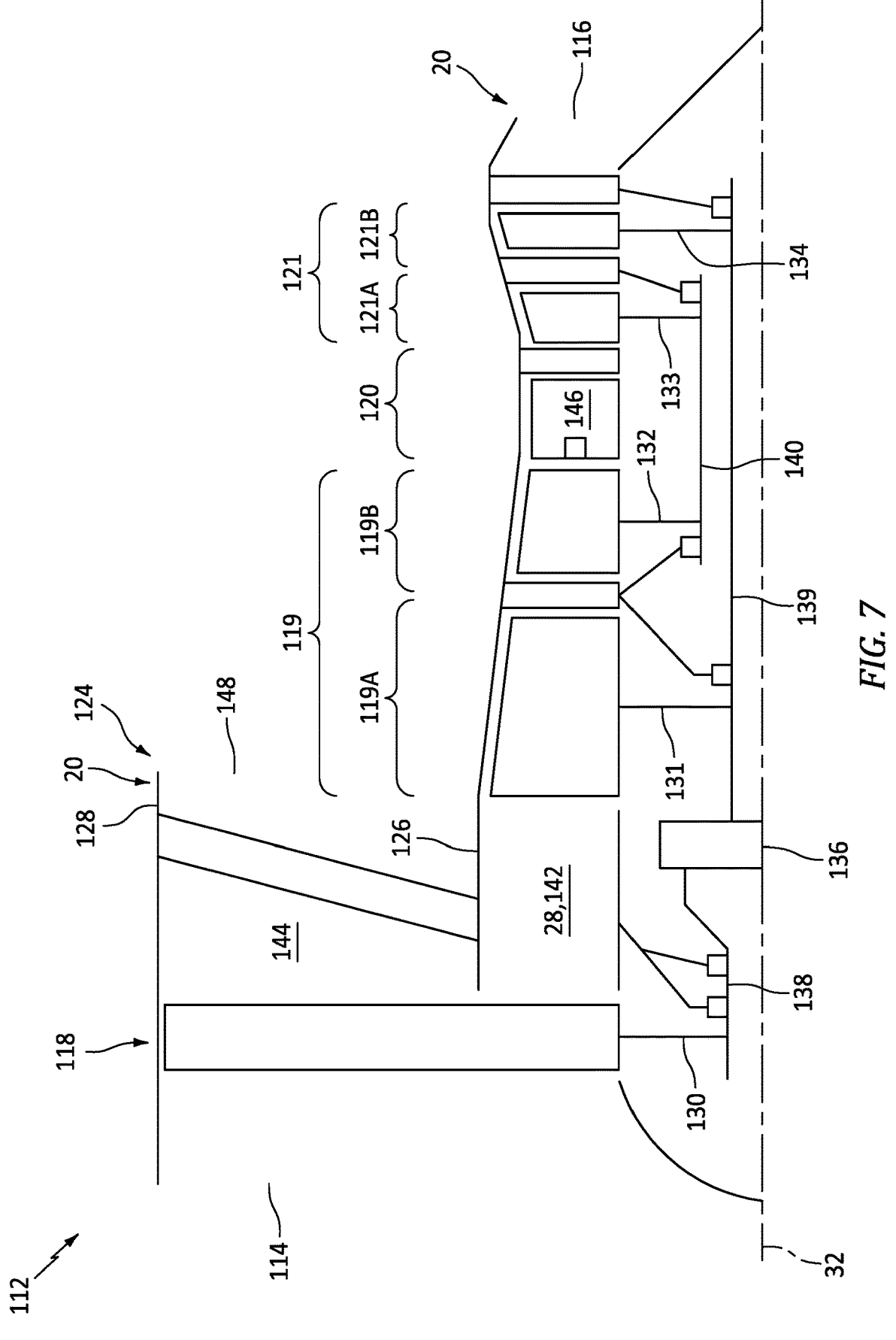
FIG. 7 is a partial side schematic illustration of a gas turbine engine which may include the variable area nozzle.

FIG. 7 illustrates the aircraft engine as a gas turbine engine 112; e.g., a turbofan engine. This turbine engine 112 extends axially along an axial centerline (e.g., the axis 32) between a forward, upstream airflow inlet 114 and an aft, downstream combustion products exhaust 116. The turbine engine 112 includes a fan section 118, a compressor section 119, a combustor section 120 and a turbine section 121. The compressor section 119 includes a low pressure compressor (LPC) section 119A and a high pressure compressor (HPC) section 119B. The turbine section 121 includes a high pressure turbine (HPT) section 121A and a low pressure turbine (LPT) section 121B.

The engine sections 118-121B are arranged sequentially along the axis 32 within an engine housing 124. This engine housing 124 includes an inner case 126 (e.g., a core case) and an outer case 128 (e.g., a fan case). The inner case 126 may house one or more of the engine sections 119A-121B; e.g., an engine core. The outer case 128 may house at least the fan section 118.

Each of the engine sections 118, 119A, 119B, 121A and 121B includes a respective bladed rotor 130-134. Each of these engine rotors 130-134 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 130 is connected to a geartrain 136, for example, through a fan shaft 138. The geartrain 136 and the LPC rotor 131 are connected to and driven by the LPT rotor 134 through a low speed shaft 139. The HPC rotor 132 is connected to and driven by the HPT rotor 133 through a high speed shaft 140.

During turbine engine operation, air enters the turbine engine 112 through the airflow inlet 114. This air is directed through the fan section 118 and into a core flowpath 142 (e.g., the flowpath 28) and a bypass flowpath 144. The core flowpath 142 extends sequentially through the engine sections 119A-121B; e.g., the engine core. The air within the core flowpath 142 may be referred to as "core air". The bypass flowpath 144 extends through a bypass duct, which bypasses the engine core. The air within the bypass flowpath 144 may be referred to as "bypass air".

The core air is compressed by the LPC rotor 131 and the HPC rotor 132 and directed into a (e.g., annular) combustion chamber 146 of a (e.g., annular) combustor in the combustor section 120. Fuel is injected into the combustion chamber 146 and mixed with the compressed core air to provide a fuel-air mixture. This fuel-air mixture is ignited and combustion products thereof flow through and sequentially drive rotation of the HPT rotor 133 and the LPT rotor 134. The rotation of the HPT rotor 133 and the LPT rotor 134 respectively drive rotation of the HPC rotor 132 and the LPC rotor 131 and, thus, compression of the air received from a core airflow inlet. The rotation of the LPT rotor 134 also drives rotation of the fan rotor 130. The rotation of the fan rotor 130 propels the bypass air through and out of the bypass flowpath 144. The propulsion of the bypass air may account for a majority of thrust generated by the turbine engine 112, e.g., more than seventy-five percent (75%) of engine thrust. The turbine engine of the present disclosure, however, is not limited to the foregoing exemplary thrust ratio.

With the arrangement of FIG. 7, the variable area nozzle 20 may be arranged at and may form the combustion products exhaust 116, or alternatively an exhaust 148 from the bypass flowpath 144. The present disclosure, however, is not limited to such an exemplary variable area nozzle arrangement along the core flowpath 142. With different types and configurations of aircraft engines, the variable area nozzle 20 may alternatively be arranged at other (e.g., more upstream) locations along the core flowpath 142. The present disclosure, therefore, is not limited to exhaust nozzle arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft engine, comprising:
a variable area nozzle including a nozzle inner structure, a nozzle outer structure, an actuation system and a flowpath extending axially along an axis through the variable area nozzle and radially between the nozzle inner structure and the nozzle outer structure;
the nozzle inner structure including a nozzle wall and a nozzle sleeve, the nozzle wall extending axially along and circumferentially around the axis, the nozzle wall comprising a plurality of slots arranged circumferentially about the axis, each of the plurality of slots projecting radially through the nozzle wall, and the nozzle sleeve axially overlapping and circumscribing the nozzle wall; and
the actuation system including a carriage and an actuator, the carriage including a hub, a plurality of struts, an outer platform, and an outer bearing, the plurality of struts arranged circumferentially about and connected to the hub, each of the plurality of struts projecting radially through a respective one of the plurality of slots wherein the nozzle sleeve is attached to the carriage at an outer end of the carriage, the outer platform radially outboard of the nozzle wall with each of the plurality of struts projecting radially in from the outer platform, the outer bearing radially between and engaged with the outer platform and the nozzle wall, the actuator disposed radially within the inner nozzle wall and coupled to the hub, and the actuation system configured to move the nozzle sleeve axially along the nozzle wall.

2. The apparatus of claim 1, wherein
the carriage further includes a rim forming the outer end of the carriage, and the nozzle sleeve is attached to the rim; and
each of the plurality of struts extends radially across the nozzle wall between the hub and the rim.

3. The apparatus of claim 1, wherein the outer bearing comprises a bushing.

4. The apparatus of claim 1, wherein the carriage is attached to a portion of the nozzle sleeve with a frustoconical geometry.

5. The apparatus of claim 1, wherein the carriage is attached to a portion of the nozzle sleeve with a cylindrical geometry.

6. The apparatus of claim 1, wherein
the nozzle sleeve extends axially between an upstream end and a downstream end; and
the carriage is attached to the nozzle sleeve at a location axially closer to the downstream end than the upstream end.

7. The apparatus of claim 6, wherein the downstream end is radially spaced from the nozzle wall by an annular gap.

8. The apparatus of claim 6, wherein a portion of the nozzle sleeve at the upstream end abuts radially against and is configured to slide along the nozzle wall.

9. The apparatus of claim 1, wherein
the nozzle sleeve extends axially between an upstream end and a downstream end; and
an outer surface of the nozzle sleeve radially tapers inward towards the axis as the nozzle sleeve extends axially towards the downstream end.

10. The apparatus of claim 1, wherein
the nozzle inner structure further includes a mount;
the nozzle wall circumscribes and is connected to the mount; and
the actuator is coupled to the mount, and the actuator extends axially between the mount and the carriage.

11. The apparatus of claim 1, wherein the actuator comprises a linear actuator.

12. The apparatus of claim 1, wherein the variable area nozzle is configured as a convergent-divergent nozzle.

13. An apparatus for an aircraft engine, comprising:

a variable area nozzle including a nozzle inner structure, a nozzle outer structure, an actuation system and a flowpath extending axially along an axis through the variable area nozzle and radially between the nozzle inner structure and the nozzle outer structure;

the nozzle inner structure including a nozzle wall and a nozzle sleeve, the nozzle wall extending axially along and circumferentially around the axis, the nozzle wall comprising a plurality of slots arranged circumferentially about the axis, each of the plurality of slots projecting radially through the nozzle wall, and the nozzle sleeve axially overlapping and circumscribing the nozzle wall; and the actuation system including a carriage and an actuator, the carriage including a hub, a plurality of struts, an inner platform, and an inner bearing, the plurality of struts arranged circumferentially about and connected to the hub, each of the plurality of struts projecting radially through a respective one of the plurality of slots wherein the nozzle sleeve is attached to the carriage at an outer end of the carriage, the actuator disposed radially within the inner nozzle wall and coupled to the hub, and the actuation system configured to move the nozzle sleeve axially along the nozzle wall;

wherein the inner platform is radially inboard of the nozzle wall with each of the plurality of struts projecting radially out from the inner platform; and wherein the inner bearing is radially between and engaged with the inner platform and the nozzle wall.

14. The apparatus of claim 13, wherein the inner bearing comprises a bushing.

15. The apparatus of claim 13, wherein the carriage is attached to a portion of the nozzle sleeve with a frustoconical geometry.

16. The apparatus of claim 13, wherein the carriage is attached to a portion of the nozzle sleeve with a cylindrical geometry.

17. The apparatus of claim 13, wherein the nozzle sleeve extends axially between an upstream end and a downstream end; and the carriage is attached to the nozzle sleeve at a location axially closer to the downstream end than the upstream end.

18. The apparatus of claim 13, wherein the nozzle sleeve extends axially between an upstream end and a downstream end; and an outer surface of the nozzle sleeve radially tapers inward towards the axis as the nozzle sleeve extends axially towards the downstream end.

19. The apparatus of claim 13, wherein the nozzle inner structure further includes a mount;

the nozzle wall circumscribes and is connected to the mount; and the actuator is coupled to the mount, and the actuator extends axially between the mount and the carriage.

20. The apparatus of claim 13, wherein the actuator comprises a linear actuator.

* * * * *